United States Patent [19]

Patrikeev et al.

[11] 3,887,580

[45] June 3, 1975

[54] METHOD OF CRYSTALLIZATION OF WATER IN SUPERCOOLED CLOUDS AND FOGS AND REAGENT USEFUL IN SAID METHOD

[76] Inventors: Veniamin Vasilievich Patrikeev, ulitsa Dmitria Ulyanova, 4, korpus 2, kv. 195; Anna Davydovna Malkina, Leningradskoe Shosse, 112, korpus 3, kv. 691, both of Moscow; Amiran Ilich Kartsivadze, ulitsa Barnova, 64, Tbilisi, all of U.S.S.R.

[22] Filed: Sept. 8, 1972

[21] Appl. No.: 287,361

[52] U.S. Cl............. 252/319; 71/DIG. 2; 239/2 R; 239/2 S; 252/305
[51] Int. Cl............................................. B01d 17/00
[58] Field of Search............. 252/319; 239/2 R, 2 S, 239/14; 71/DIG. 2

[56] References Cited
UNITED STATES PATENTS 2,962,450  11/1960  Elod et al. .......................... 252/319
3,056,556  10/1962  Sanger et al. ........................ 239/2 R

OTHER PUBLICATIONS

Martell et al.: "Chemistry of the Metal Chelate Compounds," Prentice-Hall Inc., Englewood Cliffs, N.J., (1952), pp. 67, 151–154, 164, 165.

*Primary Examiner*—Richard D. Lovering

[57] ABSTRACT

Water in supercooled clouds or fogs is crystallized or condensed by subliming a crystallizing agent to form an aerosol thereof, and introducing said aerosol into said supercooled clouds or fogs, said crystallizing agent being a sublimable metal chelate of an acetoacetic ester or a B-diketone with a metal which is Cu, V, Mo or Co. The crystallizing agents used have the advantages of being inexpensive, of having low toxicity, and of containing metals required for microfertilizing the soil.

6 Claims, No Drawings

METHOD OF CRYSTALLIZATION OF WATER IN SUPERCOOLED CLOUDS AND FOGS AND REAGENT USEFUL IN SAID METHOD

The present invention relates to methods of actively affecting atmospheric processes.

Such an action may be used for preventing formation of fog, for artificial initiation of rainfall, and for dispersion of fog.

On introducing a reagent into a cloud and sublimating it therein, a large number of nuclei of crystallization of ice are formed. Therefore, instead of large-size hail pieces, a large number of small crystals of ice or drops of rain fall onto the earth.

At present such operations are effected for reducing the strength of hurricanes, extinguishing of forest fires and dispersion of clouds and fogs above airfields.

Substances which are known to cause crystallization of supercooled clouds and fogs, include inorganic compounds such as silver iodide, lead iodide and solid carbon dioxide as a cooling agent, and organic compounds such as phloroglucinol and metaldehyde. However, the use of the above substances is disadvantageous in that silver iodide is a critical and expensive material, lead iodide is toxic, while the use of solid carbon dioxide is associated with great technical difficulties both in storage and transportation of this compound to a supercooled cloud.

The above-said organic reagents find limited applications due to a narrow temperature range of sublimation for creating active nuclei.

It is also known in the art to use copper compounds, particularly $CuS$, $Cu_2O$, as a reagent (cf. FRG Patent No. 1,007,101, Cl. AOlg 15/00 IPC) or similar substances (cf. French Patent No. 1,142,299, Cl. AOlg 15/00 IPC).

However, on using these compounds, it is difficult to obtain active nuclei which are produced due to thermal sublimation within a narrow temperature range or due to a blast dispersion, for example, when use is made of $CuS$.

In addition, these organic and inorganic substances used as a reagent produce nuclei of crystallization having a low resistance to atmospheric effects such as solar radiation.

An object of the present invention is to provide a method of effectively acting on supercooled clouds and fogs by less expensive means compared with those used nowdays for preventing hail falls, for dispersion of fog and for artificially causing rain fall.

Another object of the invention is to provide a method of effectively acting on supercooled clouds and fogs with means containing metals required for microfertilizing the soil.

Still another object of the invention is to provide a method of effectively, acting on supercooled clouds and fogs through the use of means having a higher resistance to temperature and atmospheric effects as compared to those used heretofore.

These and other objects are attained by providing a method of water crystallization in supercooled clouds and fogs by means of a crystallizing agent acting thereon the crystallizing agent, according to the invention, containing sublimable chelates of beta-diketones and beta-ketoesters taken either separately or in combination.

In the herein described method, it is preferable for forming chelates, to make use of metals of the first subgroup of the Periodic Table, as well as of vanadium, cobalt and molybdenum, taken either separately or in combination.

It is expedient to utilize copper acetylacetonate as the metal chelate of a beta-diketone.

It is advisable to utilize a copper derivative of acetoacetic ester as the metal chelate of a beta-diketoester.

It is also advisable that the combination of metal chelates of a beta-diketone and a beta-diketoester be used in the form of a mixture having the following composition, in wt.%:

| | |
|---|---|
| copper acetylacetonate | 20 – 50 |
| copper derivative of acetoacetic ester | 74 – 50. |

The substances (reagents) according to the invention relate to complex (chelate) compounds and are metal acetylacetonates, particularly, copper acetylacetonate, and also some of the acetoacetic ester chelates thereof.

These substances have a number of advantages over the known reagents. In accordance with the data obtained by the inventors, these reagents cause crystallization of supercooled drops of water at a higher temperature, have a high thermal resistance, provide for nuclei of crystallization which are more stable under the atmospheric effects, and feature a high yield of active nuclei per gram of the reagent.

Another advantage is that the proposed reagent is inexpensive and has a low toxicity.

Acetylacetonates of metals are substantially rather stable and easily sublimable compounds.

By using various metals in the process of production of acetylacetonates and introducing them as additives in the copper acetylacetonate, it is possible to obtain iceforming reagents containing microelements necessary for the soils of a given region.

Copper acetylacetonate having a threshold of crystallization in the order of $-1°$ to $2°C$ is of particular interest, since the best reagent widely used in pyrocompounds for sublimation of silver iodide has a temperature threshold of $-4°$ to $-5°C$, and lead iodide of $-7°C$.

Mixtures of copper acetylacetonate with a copper complex obtained from acetoacetic ester are also advantageous.

This reagent can be obtained both by means of mechanical mixing of these compounds and by a combined precipitation of copper by means of acetoacetic ester with acetylacetone.

Given below are some examples of carrying the present invention into effect.

EXAMPLE 1

2 mg of copper acetylacetonate were taken. After sublimation at a temperature of 300°–450°C, a hundredth of the aerosol formed during sublimation was introduced into a chamber with fog (in all Examples a chamber was used having a volume of 250 liters). The crystallization of the supercooled fog particles was observed starting at $-2°C$ and lower. None of the hitherto known reagents including silver iodide and phloroglucinol caused the crystallization of fog particles under these conditions.

EXAMPLE 2

2 mg of vanadyl acetylacetonate were taken. After sublimation at a temperature of 300°–450°C a hundredth of the aerosol formed during sublimation was introduced into a chamber with fog at a temperature of 300°–450°C. The crystallization of the supercooled particles of fog was observed starting at −5°C.

EXAMPLE 3

2 mg of molybdyl acetonate were taken. During sublimation at a temperature of 300°–450°C a hundredth of the aerosol obtained during the process was introduced into the fog chamber. The crystallization of the supercooled drops was observed starting at −4.5°C with somewhat lower yield of active nuclei than in the case of copper acetylacetonate.

EXAMPLE 4

2 mg of copper chloro-3-acetylacetonate were taken. The reagent was sublimed at a temperature of 450°–500°C. A hundredth portion of the aerosol obtained during the sublimation was introduced into the fog chamber.

The beginning of crystallization of the supercooled drops in the chamber was observed 30 seconds after closing the chamber. The observed temperature threshold of crystallization was −5°C.

EXAMPLE 5

2 mg of a complex of copper with acetoacetic ester were taken and sublimed at a temperature of 500°C.

A hundredth of the obtained aerosol was introduced into the fog chamber; thereafter, the crystallization of the supercooled fog was observed.

The crystallizing action of the copper chelate was observed starting at −3°C.

EXAMPLE 6

2 mg of a mixture of copper acetylacetonate and a complex of copper with acetoacetic ester were taken in a ratio of 1:1.

The reagent was sublimed at a temperature of 350°–400°C. A hundredth of the obtained aerosol was introduced into the fog chamber; thereafter, the crystallization of the super-cooled fog was observed starting at −1.5°C.

EXAMPLE 7

2 mg of a complex of copper with acetoacetanilide were taken. After sublimation at a temperature of 4502 C a hundredth of the obtained aerosol was introduced into the fog chamber. The crystallization of the supercooled fog was observed starting at −5°C.

EXAMPLE 8

2 mg of a mixture of copper acetylacetonate (25%) with a copper complex of acetoacetic ester (75%) were taken. After sublimation of the mixture at a temperature of 400°C, a hundredth of the obtained aerosol was taken and introduced into the fog chamber. The crystallization began at −2°C.

EXAMPLE 9

2 mg of a mixture of copper acetylacetonate and vanadyl acetylacetonate in a ratio of 1:1 were taken. After sublimation of the mixture at a temperature of 500°C, a hundredth of the obtained aerosol was taken. The crystallization of the supercooled fog began at −3°C.

EXAMPLE 10

2 mg of a mixture of copper acetylacetonate and cobalt acetylacetonate were taken. After sublimation at a temperature of 400°C, a hundredth of the obtained aerosol was taken. The crystallization of the fog began at −3°C.

EXAMPLE 11

2 mg of a mixture of molybdyl acetylacetonate and copper acetylacetonate in a ratio of 1:1 were taken. After sublimation at a temperature of 500°C, a hundredth of the obtained aerosol was taken. The crystallization began at −4°C.

Satisfactory results have been also obtained when using an aerosol of silver acetylacetonate as an activator of crystallization of supercooled particles of fog.

Poorer results have been obtained when using acetylacetonates of cerium, magnesium, cobalt, and other metals as reagents.

On using copper acetylacetonate as a reagent for action on supercooled clouds and fogs, the yield of active nuclei per gram of the reagent was $5 \times 10^{12} - 10^{13}$ particles at a temperature of −10°C. This is comparable to the yield of active nuclei with silver iodide.

Copper bromo-3-acetylacetonate, copper methyl-3-acetonate, copper benzoinacetonate also have given positive results; the yield of active nuclei was about $10^{11}$ particles at −10°C, the threshold of crystallization was −5°C.

The test of the reagents for their resistance to the action of ultraviolet rays has shown the nuclei of crystallization obtained from these reagents to be stable and in this respect more advantageous than silver iodide.

During sublimation in pyrocompounds giving acidic or alkaline reaction products, the nuclei of crystallization of the reagents according to the invention proved to be sufficiently resistant.

The yield of active nuclei per gram of the substance is equal to $5-7.10^{12}$ particles.

Thus, the reagents can be used for separate sublimation in pyrocompounds, smoke pots, burners, and in other devices for forming aerosols.

We claim:

1. A method for crystallizing or condensing water in supercooled clouds or fogs comprising the steps of subliming a crystallizing agent to form an aerosol of said crystallizing agent and introducing said aerosol into said supercooled clouds or fogs wherein the crystallizing agent is a sublimable metal chelate of acetoacetic ester or a β-diketone selected from the group consisting of acetylacetone, 3-chloroacetylacetone and acetoacetanilide with a metal selected from the group consisting of copper, vanadium molybdenum and cobalt, said chelate being taken alone or in combination.

2. A method according to claim 1 wherein the metal chelate is selected from the group consisting of copper acetylacetonate, vanadyl acetylacetonate, molybdyl acetylacetonate, copper 3-chloroacetylacetonate, copper chelate of acetoacetic ester, copper acetoacetanilide, a mixture of copper acetylacetonate and the copper chelate of acetoacetic ester, a mixture of copper acetylacetonate and vanadyl acetylacetonate, a mixture of copper acetylacetonate and cobalt acetylacetonate, and a mixture of copper acetylacetonate and molybdyl acetylacetonate.

3. A method according to claim 2 wherein the crystallizing agent is a mixture of copper acetylacetonate and the copper chelate of acetoacetic ester in the following per cent by weight:

| | |
|---|---|
| copper acetylacetonate | 25 – 50 |
| copper chelate of acetoacetic ester | 75 – 50. |

4. A method according to claim 2 wherein the crystallizing agent is copper acetylacetonate.

5. A method according to claim 2 wherein the crystallizing agent is the copper chelate of acetoacetic ester.

6. A reagent for use in crystallizing or condensing water in supercooled clouds and fogs, said reagent consisting of a mixture having the following composition in parts by weight:

| | |
|---|---|
| copper acetylacetonate | 25 – 50 |
| copper chelate of acetoacetic ester | 75 – 50. |

* * * * *